United States Patent
Danziger et al.

(10) Patent No.: US 11,232,080 B2
(45) Date of Patent: *Jan. 25, 2022

(54) SYSTEMS AND METHODS FOR PROVIDING ACCESS TO A DATA FILE STORED AT A DATA STORAGE SYSTEM

(71) Applicant: Google LLC, Mountain View, CA (US)

(72) Inventors: Joshua Danziger, Metchen, NJ (US); Alissa Feldman, New York, NY (US); Lai Kwan Wong, New York, NY (US)

(73) Assignee: Google LLC, Mountain View, CA (US)

( * ) Notice: Subject to any disclaimer, the term of this patent is extended or adjusted under 35 U.S.C. 154(b) by 146 days.

This patent is subject to a terminal disclaimer.

(21) Appl. No.: 16/544,817

(22) Filed: Aug. 19, 2019

(65) Prior Publication Data

US 2019/0370228 A1    Dec. 5, 2019

Related U.S. Application Data

(63) Continuation of application No. 15/433,815, filed on Feb. 15, 2017, now Pat. No. 10,387,383.

(51) Int. Cl.
*G06F 16/182* (2019.01)
*G06F 16/10* (2019.01)
(Continued)

(52) U.S. Cl.
CPC ............ *G06F 16/183* (2019.01); *G06F 8/61* (2013.01); *G06F 8/65* (2013.01); *G06F 16/10* (2019.01);
(Continued)

(58) Field of Classification Search
CPC ........ G06F 16/183; G06F 16/172; G06F 8/65; G06F 16/10; G06F 8/61; H04L 67/06
(Continued)

(56) References Cited

U.S. PATENT DOCUMENTS 8,931,054 B2 * 1/2015 Huynh ................ G06F 3/0622
726/3
9,319,469 B2   4/2016 Ruhlen et al.
(Continued)

FOREIGN PATENT DOCUMENTS

CN    1754155 A    3/2006
CN    104239509    12/2014
(Continued)

OTHER PUBLICATIONS

Combined Search and Examination Report for G.B. Application No. 1717949.0 dated Apr. 16, 2018 8 pages.
(Continued)

*Primary Examiner* — Shahid A Alam
(74) *Attorney, Agent, or Firm* — Lowenstein Sandler LLP

(57) ABSTRACT

An application server receives from a user device a first request to create a data file that is to be stored at a third-party storage server. Responsive to receiving the first request to create a data file that is to be stored at the third-party storage server, the application server sends to the third-party storage server a second request indicating that the data file is to be created at the third-party storage server. An indication that the data file has been created at the third-party storage server is received from the third-party storage server. Responsive to receiving the indication that the data file has been created at the third-party storage server, the application server generates an instance of the data file that is stored at the application server. The application server provides to the user device the instance of the data file for edit via a relevant application.

20 Claims, 5 Drawing Sheets

(51) Int. Cl.
   *G06F 16/172*   (2019.01)
   *G06F 8/61*     (2018.01)
   *G06F 8/65*     (2018.01)
   *H04L 29/08*    (2006.01)

(52) U.S. Cl.
   CPC ............ *G06F 16/172* (2019.01); *H04L 67/02* (2013.01); *H04L 67/06* (2013.01); *H04L 67/1097* (2013.01)

(58) Field of Classification Search
   USPC .......................................................... 707/827
   See application file for complete search history.

(56) References Cited

U.S. PATENT DOCUMENTS

| | | |
|---|---|---|
| 2004/0186861 A1 | 9/2004 | Phatak |
| 2004/0267712 A1 | 12/2004 | Papanyan et al. |
| 2005/0138176 A1 | 6/2005 | Singh |
| 2006/0156353 A1 | 7/2006 | Dorner |
| 2007/0027929 A1* | 2/2007 | Whelan ............... G06F 16/1734 |
| 2008/0155012 A1 | 6/2008 | Chiang |
| 2011/0029896 A1 | 2/2011 | Cheng |
| 2012/0101980 A1 | 4/2012 | Taleghani et al. |
| 2013/0080507 A1 | 3/2013 | Ruhlen et al. |
| 2013/0238552 A1 | 9/2013 | Saib |
| 2013/0305039 A1 | 11/2013 | Gauda |
| 2014/0081933 A1 | 3/2014 | Uhrhane et al. |
| 2014/0101103 A1* | 4/2014 | Chan ...................... G06F 16/27 707/634 |
| 2014/0237571 A1 | 8/2014 | OBrien et al. |
| 2015/0358357 A1 | 12/2015 | Diaz-Tellez et al. |
| 2016/0080515 A1 | 3/2016 | Kruglick |
| 2016/0085765 A1 | 3/2016 | Verma |

FOREIGN PATENT DOCUMENTS

| | | |
|---|---|---|
| CN | 104239509 A | 12/2014 |
| CN | 104506647 A | 4/2015 |
| CN | 106021381 A | 10/2016 |
| CN | 106293701 A | 1/2017 |
| CN | 106341371 A | 1/2017 |
| WO | 0133381 A1 | 5/2001 |

OTHER PUBLICATIONS

International Search Report and Written Opinion for PCT/US2017/058889, dated Feb. 19, 2018, 11 pages.
Written Opinion of the International Preliminary Examining Authority for PCT/US2017/058889, dated Oct. 4, 2018, 7 pages.
Germany Office Action dated Sep. 21, 2021, on application No. 102017125428.5.

* cited by examiner

SYSTEMS AND METHODS FOR PROVIDING ACCESS TO A DATA FILE STORED AT A DATA STORAGE SYSTEM

CROSS-REFERENCE TO RELATED APPLICATIONS

This application is a continuation application of U.S. patent application Ser. No. 15/433,815, filed Feb. 15, 2017, the entire contents of which are hereby incorporated by reference herein.

TECHNICAL FIELD

In general, this disclosure relates to data file management in a remote access environment, in particular, to systems and methods for providing access to a data file stored at a remote data storage system.

BACKGROUND

A user sometimes needs to access and edit a variety of data files. For example, the user may need to open or edit a word processing file, a spreadsheet file, a database file, a programming source code file, a presentation slide deck, an email message file, an image file, a video file, or another type of file. Each of these data files may require a respective dedicated software application to open or edit the respective data file. Thus, the user usually needs to install the required dedicated software on a local computer in order to open the various types of data files. When a specific software is unavailable at the user's device, the user is then unable to access and operate on a certain type of data file.

When the user attempts to open and edit a data file stored at a remote server, existing document systems usually require the user to download the data file from the remote server to the user's local computer so that the user can open the data file via a specific locally installed software application. The downloading of the remotely stored data file and the requirement to locally install a variety of software applications in order to operate on different types of data files can be resource-inefficient. Moreover, when the user is operating a mobile device such as a smartphone, which lacks either the capacity to install a computer application or the memory space to download a data file, that access to the data file becomes infeasible.

SUMMARY

Systems and methods disclosed herein provide a mechanism for providing access to a data file stored at a remote data storage system. An application server hosting a variety of applications is used to allow a user device to open a data file that is stored at a remote data storage system without the user device having to download a copy of the data file or locally install a relevant application. The user device sends a file access request, via a user interface provided by the remote storage server, to the application server to access a data file stored at the remote storage server. The application server can then optionally identify a relevant application for accessing the data file, and send, to the remote server, a metadata-and-content request relating to the data file. The metadata-and-content request includes version information of a previously cached version of the data file cached at the application server. Upon receiving the metadata-and-content request, the remote storage server verifies whether the cached version of the data file is the latest version based on the version information received from the metadata-and-content request. When the cached version is not the latest version, the application server receives the latest version of the data file from the remote storage server, which is used to replace the previously cached version. The latest version of the data file is then presented, via the relevant application on the application server, to the user device. In this way, a user can open, comment, or edit the latest version of a data file stored at the remote storage server without downloading the data file to the user device, or locally installing a relevant application on the user device.

BRIEF DESCRIPTION OF THE DRAWINGS

The above and other features of the present disclosure, including its nature and its various advantages, will be more apparent upon consideration of the following detailed description, taken in conjunction with the accompanying drawings in which.

DETAILED DESCRIPTION

Figure 1:
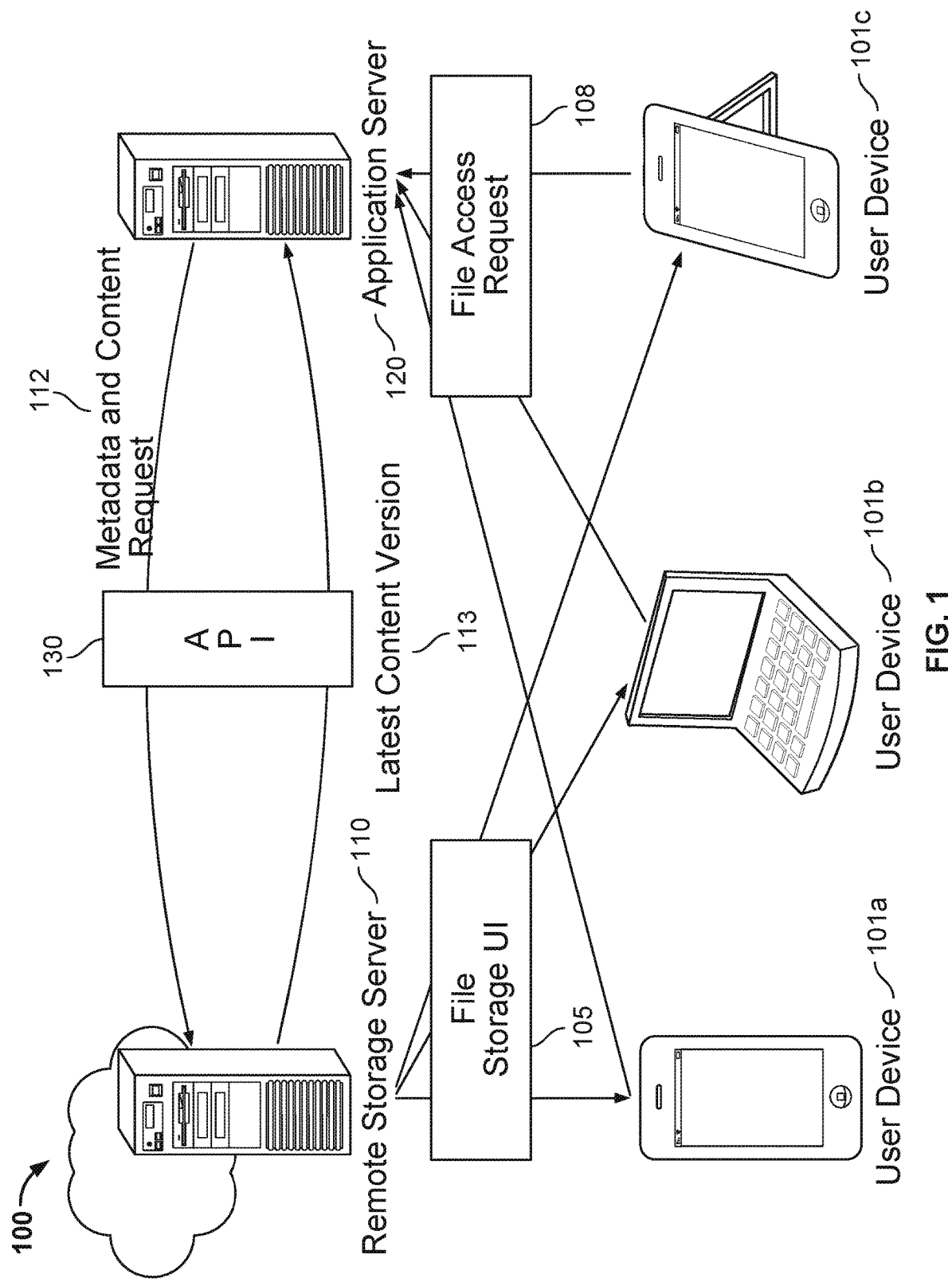
FIG. 1 provides an example data flow diagram illustrating data message passing for providing access to a data file stored at a remote data storage system between a user device, an application server and a remote storage server, according to an illustrative embodiment.

To provide an overall understanding of the systems and methods described herein, certain embodiments will now be described, including a system and method for providing access to a data file stored at a remote data storage system. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more engines, which include a processing device or devices, such as a computer, microprocessor, logic device or other device or processor that is configured with hardware, firmware, or software to carry out one or more of the computerized methods described herein.

In one embodiment, a mechanism for providing access to a data file stored at a remote data storage system is discussed herein. A protocol is provided for a remote application server to communicate with a remote storage server such that the remote application server can launch an application to access and perform operations on a data file that is originally stored at the remote storage server. Specifically, the remote application server sends an initial request to the remote storage server via an Application Programming Interface (API), for metadata and content associated with a data file that a user attempts to access. The remote storage server can, in turn, verify whether the remote application server has the latest version of the requested data file, and sends the latest version of the requested data file to the application server if the application server does not have the latest version. In this way, the remote application server can open the latest version of a data file without a user having to either download the data file to a local device, or install a specific application locally in order to access and edit the data file.

For example, a user may attempt to open a data file stored at a remote storage server via a remote storage user interface, e.g., a browser-based interface. An access request is then sent via the browser-based interface to a remote application server to launch a relevant application in order to open the requested data file. The remote application server sends a request for metadata and content associated with the data file to the remote storage server. The metadata-and-content request can be a single request that includes requests for both updated metadata and updated content of a data file. The metadata-and-content request includes at least a content version of the data file that is currently stored in the cache on the remote application server. Upon receipt of the metadata-and-content request, the remote storage server determines whether the content version is the latest version of the data file, and in turn, sends the latest version of the data file to the remote application server. In this way, the remote application server can open the latest version of the requested data file for the user.

FIG. 1 provides an example diagram 100 illustrating data flows between a user device 101a-c (herein, collectively referred to as 101), an application server 120 and a remote storage server 110 for providing access to a data file stored at a remote data storage system, according to an illustrative embodiment. The one or more entities including, but not limited to, the user device 101, the application server 120, the remote storage server 110 communicate via one or more communication networks.

The user device 101 includes a variety of personal devices such as, but not limited to, a smartphone, a laptop computer, a desktop computer, a work station, a tablet computer, a personal digital assistant (PDA), or the like. A user can operate the user device 101 to communicate with the remote storage server 110 and/or the application server 120.

The remote storage server 110 can be hosted by a remote provider that is independent of the application server 120 or the user device 101. For example, the remote storage server 110 can be physically separated, hosted at a different domain, owned by a different entity, or the like, from any of the user device 101 or the application server 120. Or, alternatively, the remote storage server 110 can share the same public or private cloud with the application server 120. The remote storage server 110 can provide a file storage user interface 105 to the user device 101 such that a user can interact with data files stored at the remote storage server 110 via the user interface 105. The user interface 105 can include a mobile application (e.g., at a smartphone or tablet computer, etc.), or a browser-based application (e.g., at a computer, etc.), or the like. A browser-based application is used as one example of user interface 105 throughout this document.

Within the file storage user interface 105, the user can configure or pre-configure how to open a data file. For example, a user can pre-configure one or more data files to be opened by applications from the application server 120 before the user attempts to open any data file, or the user can right-click on a data file icon and choose "open with" to configure an application from the application server 120 as the application to open the file. When the user selects a data file to access via the file storage user interface 105, if the user has pre-configured an application from the application server 120 as the default application, or has chosen an application from the application server 120 to open the file on the fly, the user device 101 sends a file access request 108 to the application server 120. The file access request includes information such as, but not limited to a data file identifier, a storage server identifier, a type of the data file, a user device identifier and/or the like. In some implementations, the document identifier, the storage server identifier and optional protocol buffers can be combined and encoded into a string, and the string is included as a key into the file access request for transmission.

In some implementations, the application server 120 is a single server that hosts a variety of applications. In some implementations, the application server 120 includes multiple distributed application servers. For example, each distributed application server hosts a type of applications, such as document processing applications, software development applications, database management applications, and/or the like.

In some implementations, as further discussed in connection with FIGS. 3-4, the file access request 108 takes a form of a Hypertext Transfer Protocol (HTTP) POST request, which can be adopted when the file access request 108 is generated from a browser interface or a mobile application of the storage server. Specifically, when the storage server employs a browser-based application at the user device, the HTTP POST request is generated within a structural tag of the Hyper Text Markup Language (HTML) source code of the browser page, e.g., the <iframe> tag, etc. The structural tag defines a region on the browser page within which the requested data file or document can be displayed.

A file application programming interface (API) 130 is implemented to allow the application server 120 to get metadata and content of the data file from the remote storage server 110. The application server 120 sends a request for file metadata and content 112 via the API 130 to the remote storage server 110 for the latest version of the metadata and the latest version of the content associated with the requested data file. Example metadata properties associated with the data file include, but are not limited to: file type, file identification, file name, Multipurpose Internet Mail Extensions (MIME) type, whether the file is starred or flagged by the file system, parent file or folder, application properties, file version, create time, modified time, last-modified user name, user identifier (ID) and email address of the owner, the requester, and the creator, full file extension, file checksum (used for comparison, the storage server can choose the encoding method (e.g. MD5, SHA1, SHA2, etc.)), file size, access/editing privilege, status as to whether the file has an edit lock, or the like. The metadata-and-content request 112 can further include a proof key, which is a public key issued by the application server 120, so that the remote storage server 110, which has been previously provided the public key information by the application server 120, can verify the key information from the metadata-and-content request 112 is consistent. In this way, the key verification confirms that the metadata-and-content request 112 is sent from the application server 120. The remote storage server 110 then, in turn, sends the requested metadata and content to the application server 120. When the application server 120 does not have the latest version of the data file in its local cache, the remote storage server 110 sends the latest version of the content of the data file 113 to the application server 120, as further discussed in connection with 207 in FIG. 2.

In some implementations, the user can make changes to a data file via an application in the application server 120, and such changes are transmitted via an API 130 to the remote storage server 110 to update the data file stored at the remote storage server 110. The component of the API 130 that is instantiated on the application server 120 to interface the remote storage server 110 can be implemented in JavaScript using Post Messages. The Post Messages can be sent from the application server's JavaScript code to the remote storage server's JavaScript code at a browser page that defines a structural frame that frames a section for the application server to display the data file. The Post Messages can be used for invoking actions on the browser page, e.g., changing the title bar, opening a sharing dialog, etc. for the browser session. For example, a "title-changed" message is sent from the application server's JavaScript code to the remote storage server's JavaScript code to notify that the title of a data file has been changed (e.g., by the user device) so that the remote storage server 110 can update information relating to the title of the data file accordingly, e.g., the title bar in the browser interface of the remote storage server 110 displayed at the user device. For another example, a "sharing-opened" message is sent from the application server's JavaScript code to the remote storage server's JavaScript code to notify the remote storage server 110 that the user has clicked on the "Share" button so that the remote storage server 110 can open a sharing frame to allow the data file to be shared by the user with one or more other users. For another example, an access control message relating to a data file, e.g., an "access-control-list-opened" message, can be sent from the application server's JavaScript code to the remote storage server's JavaScript code to notify the remote storage server 110 that the user has attempted to modify the access rights of the data file, e.g., another user who does not have access to the data file is granted authorization to access the data file, so the remote storage server 110 can display an access control frame, e.g., the "access-control-list-configuration" frame, in the file storage user interface 105 of the user device.

In some implementations, the user can make changes to a data file in the remote storage server 110 directly. In this case, the remote storage server 110 sends messages via the API 130 to the application server 120 to synchronize the changes. For example, in response to a user changing a sharing dialog via the browser page, a "metadata-changed" message is sent from the remote storage server's JavaScript code to the application server's JavaScript code via the API 130 to notify the application server 120 that the user has changed file metadata (e.g., the sharing status of the data file, etc.) so the application server 120 should refresh the metadata. For another example, when a user closes an access control frame in the remote storage server 110, an access control message, e.g., an "access-control-list-configuration-closed" message, is sent from the remote storage server 110 to notify the application server 120 that the user has closed the function of access control relating to the data file, e.g., an "access-control-list-configuration" dialog, and whether or not the user has decided to proceed with the action.

In some implementations, the remote storage server 110 hosts an API 130 to communicate with the application server 120. The remote storage server 110 can configure the API 130 based on API configuration information provided by the application server 120. In some implementations, the application server 120 can include multiple different servers with multiple different uniform resource locator (URL) endpoints, each of which can relate to a different application (e.g., a different editing application, etc.). The remote storage server 110 can access a URL endpoint to instantiate an application from the application server to access, create or edit a data file. The API configuration information can be provided to the remote storage server 110 ahead of time. Or the remote storage server 110 can follow the URL endpoint on the application server to get the configuration information when the remote storage server attempts to call an application from the application server to access, create or edit a file.

Figure 2:
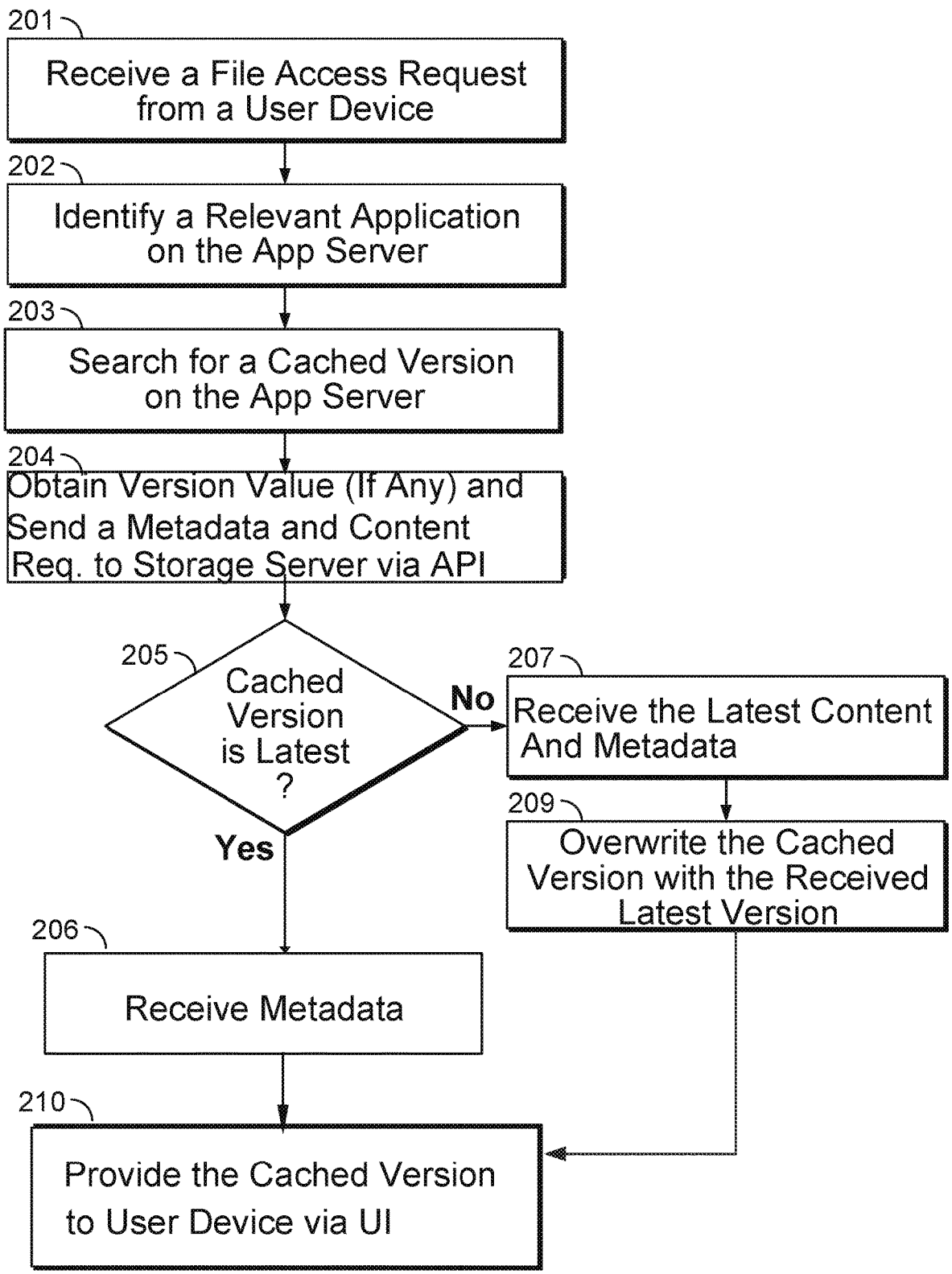
FIG. 2 is an example logic flow diagram illustrating aspects of work flows at an application server for providing access to a data file stored at a remote storage server, according to an illustrative embodiment.

FIG. 2 is an example logic flow diagram illustrating aspects of work flows at an application server (e.g., 120 in FIG. 1) for providing access to a data file stored at a remote storage server (e.g., see 110 in FIG. 1), according to embodiments described herein. At 201, the application server (e.g., 120 in FIG. 1) receives a file access request from a user device (e.g., 101 in FIG. 1) to access (e.g., open, comment, or edit) a data file stored at a remote storage server (e.g., see 110 in FIG. 1). As discussed in connection with 108 in FIG. 1, the file access request includes a data file identifier, a storage server identifier, a type of the data file, a user device identifier, and/or the like. The file access request can take the form of a HTTP POST request within a structural tag of the HTML source code of the browser page. At 202, the application server can optionally identify and launch a relevant application to open the respective data file, e.g., based on a file type of the data file included in the file access request. When the file access request further includes an application identifier to open the data file, e.g., the user has right-clicked on a data file icon to select an application to open the file, and the application identifier of the selected application is included in the file access request, the application server can launch the application directly. At 203, the application server can identify in a data store (e.g., database) for cached data files, and query whether a cached version of the data file has been previously saved in the database. At 204, if a cached version of the data file exists, the application server retrieves a version value (e.g., number) from the metadata of the cached version of the data file, and includes the version value into a request for metadata and content to send to the remote storage server. The version value is described in greater detail below in conjunction with FIG. 4. If no cached version exists, the metadata-and-content request includes an indicator identifying that no cached version exists on the application server. In one implementation, the application server can optionally include a delivery parameter in the metadata-and-content request. The delivery parameters can be a Boolean value configured as true or false, which is used to indicate whether or not the remote storage server should provide the application server with the content of the latest version of the data file if the cached version of the data file at the application server is not the latest version. For example, the application may periodically refresh the metadata of a cached version of the data file by requesting the most updated metadata of the data file from the remote server, but may not need to request the latest content of the data file every time the metadata is refreshed, to avoid excessive data traffic between the servers. In this case, the application server may set the delivery parameter in the metadata-and-content request to indicate that no latest content of the data file is needed from the remote storage server.

At 204, in addition to obtaining a version value of the cached version of the data file, the application server optionally retrieves a hash in the metadata associated with the cached version of the data file, or generates a hash based on the content of the cached version. The hash is then optionally included together with the version value of the cached version in the metadata-and-content request to be sent to the remote storage server via an API.

At 205, the application server receives a message from the storage server verifying whether the cached version on the application server is the latest version of the data file. The storage server determines whether the version value included in the metadata-and-content request reflects the latest version of the data file at the storage server. For example, the storage server maintains a data store (e.g., database) of data files with metadata including version information of each data file, and can form a search of the data file needed based on a data file identifier included in the metadata-and-content request to identify the data file, and in turn retrieve the metadata associated with the data file. In addition, if a hash of the cached version has been optionally included in the metadata-and-content request (at 204), the storage server can obtain both the version value and the hash of the cached version and compare both the received version value and the received hash with the version value and the hash associated with the latest version of the data file in the storage server. When the comparison shows that the latest version of the data file has a different version value but the same hash with the cached version, the storage server may not need to send content of the data file to the application server, as the content of the data file has not changed from the cached version.

When the cached version is the latest version of the data file, at 206, the application server can optionally receive a confirmation message from the storage server that no updated version is needed. The confirmation message can also include metadata of the data file such that the application server can keep the metadata updated. At 210, the application server can provide the cached version of the data file to the user device via the user interface (e.g., file storage UI 105 in FIG. 1). Otherwise, if the cached version in the metadata-and-content request is not the latest version of the data file, or no cache version of the data file exists on the application server at all, the application server receives metadata and content of a latest version of the data file from the storage server at 207. Specifically, when the metadata-and-content request includes a hash generated based on content of the cached version, the storage server can optionally verify whether the received hash is the same with a hash associated with the latest version. If the two hashes match, then the storage server does not need to send content of the latest version to the application server. The application server receives the metadata of the latest version and an optional message that identifies the cached version as having the latest content. If the two hashes do not match, then the application server receives the latest content and metadata, e.g., as described at 207. In one implementation, the storage server reads the delivery parameter in the metadata-and-content request to determine whether or not to send the content of the latest version of the data file to the application server if the cached version of the data file at the application server is not the latest version.

At 207, the metadata and content of the data file can be sent to the application server in a single message, or a multi-part message. For example, the content of the data file can be sent from the storage server as a copy of the data file, and metadata of the file can be sent via a URL embedded in a message. In another example, the application can receive a message including a pre-defined link to the latest version of the data file stored in the storage server.

At 209, the application server overwrites any previously cached version of the data file on the application server with the received version at 209. The application server can then provide the newly cached version to the user device via the user interface, e.g., in a similar manner as described at 206.

Figure 3:
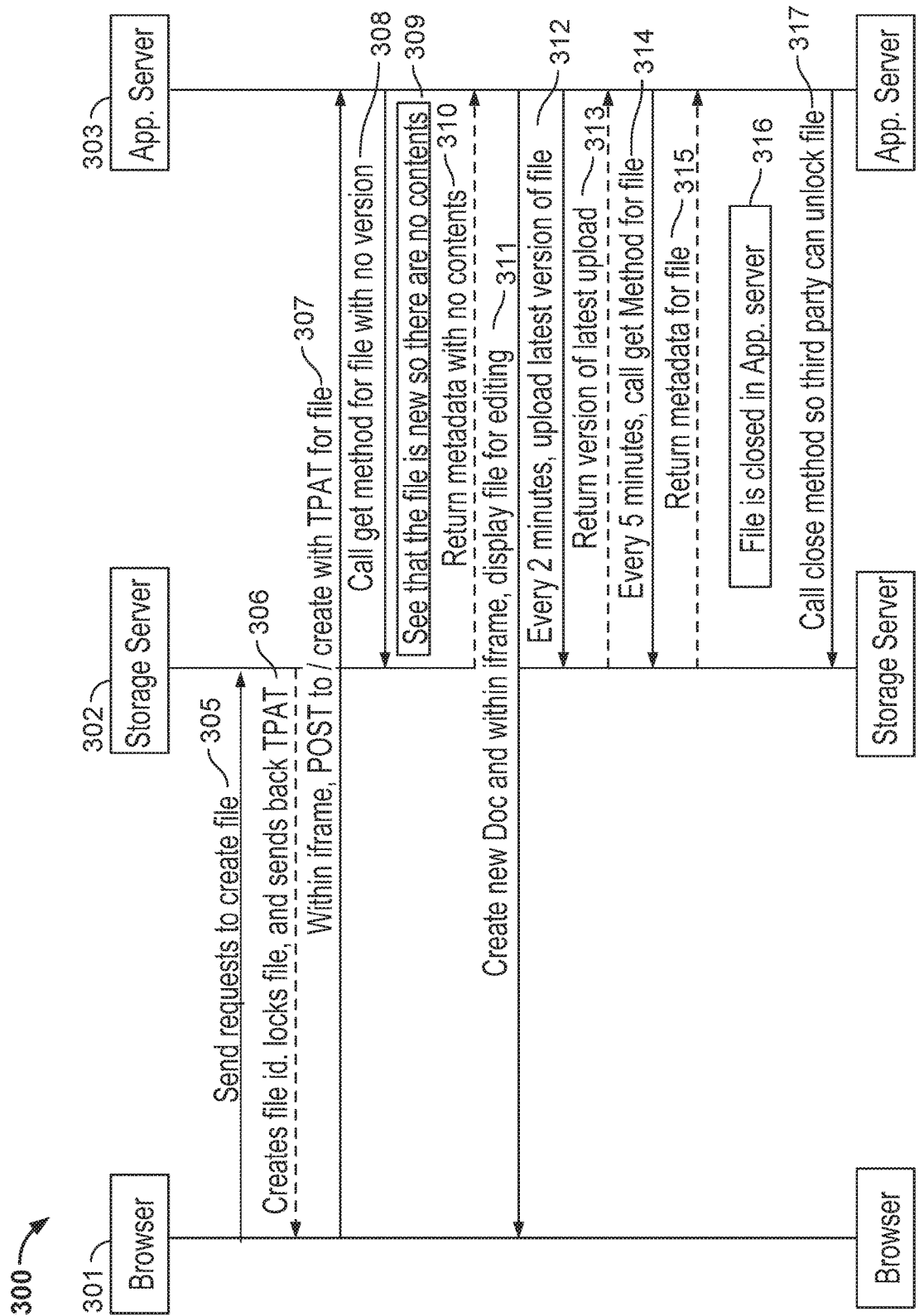
FIG. 3 provides an example flow diagram illustrating aspects of creating a new data file in the remote storage server from a user device via an application program interface (API), according to an illustrative embodiment.

FIG. 3 provides an example flow diagram 300 illustrating aspects of creating a new data file in the remote storage server from a user device via the API (e.g., 130 in FIG. 1), according to some embodiments described herein. The application server 303 (similar to 120 in FIG. 1) can send HTTP action requests such as opening an existing file, creating a new file, saving changes in a file, or the like, for the remote storage server (similar to 110 in FIG. 1) to invoke the relevant operations to be performed on a file in the user interface at a user device. At 305, a user interface instantiated at a user device (e.g., 101 in FIG. 1), such as a browser 301, can send a user request to create a file at a remote storage server 302. The create file request includes a file type, a file name, an application identifier (to create the file), a folder name and directory in the storage server indicating where the created file is to be stored, or the like. The create file request can include an HTTP POST request, which can take a form similar to "create (POST files/create)" to create a new file in the folder indicated in the create file request.

At 306, the remote storage server 302 can optionally create a file identifier, and potentially set a lock status for the file upon creating the new file. The lock status gives an entity (e.g., the application server 303) exclusive permission to create a file, to access a file or save file contents to the storage server 302 for a period of time, e.g., 5 minutes, 10 minutes, 15 minutes, etc. The storage server 302 blocks any attempted operation from any other authorized entities to create, open, or save changes with the same locked file. The other authorized entities include, but are not limited to, a user who is authorized to edit the data file, an application that is authorized to edit the data file, any remote user interface of the storage server that is authorized to edit the data file, etc.

At 306, the storage server 302 also sends a remote access token (also referred to as a "third party access token" (TPAT)) to the browser 301. The TPAT is generated by the remote storage server with an expiration timestamp, which gives an entity (e.g., a user, etc.) access to a particular file, e.g., the file to be created, prior to the expiration timestamp. The TPAT can also grant the user access to a specific file and folder metadata.

At 307, a file create request in the form of an HTTP POST request is sent to the application server 303. The file create request is generated within a structural tag of the HTML source code (e.g., the <iframe> tag) of a display page of the browser 302, and includes the TPAT that the browser 301 receives at 306. If the browser 301 receives prior requests from the application server 303 that includes a token to grant the browser 301 access to a particular application that is to be used to create the file, the browser 301 can optionally exchange the token for the TPAT.

In some implementations, a user can log into the application server 303 with user credentials, and the browser 301 can include such user credentials into the HTTP POST request at 307 for the application server 303 to authenticate the user. The user can also log into the storage server 302 via the browser 301 such that the storage server 302 can determine whether the user is authorized to create a data file or to open a data file at the storage server 302.

At 308, the application server 303 sends a metadata-and-content request in the form of an HTTP GET call "get (GET files/fileId)" to the remote storage server 302 to get the metadata and content for the file or the folder. At 309, the metadata-and-content request can include a file identifier, a file name, an indicator that no content or version for the file exists on the application server yet (as the file is newly created), etc. The remote storage server 302 can, in turn, return metadata for the newly created file in a message in response to the GET call with no contents at 310.

At 311, the application server 303 creates a new data file, e.g., a document. The newly created document can be displayed in the file storage UI. The created document can be displayed within a section defined by the structural tag (e.g., the <iframe> tag) specified by the file access request in 307. The newly created document can be edited. At 312, the application server 303 can periodically upload the latest version value of a cached version to the remote storage server 302, e.g., every two minutes, etc. An HTTP POST message, which can take a form similar to "upload (POST fileId/fileId/blob)" can be used to upload a copy of the file, wherein the "blob" parameter is the web API that the application server 303 adopts to communicate with the storage server 302. When a new file identifier is created (e.g., at 306), the POST message "uploadCopy (POST fileId/fileId/copy)" is used at 312 to upload a copy of a file to the storage server. The copy can optionally be shared with a value of users and/or entities who have access to the file, as specified by the TPAT. A response from the storage server to the POST call contains a uniform resource locator (URL) to open the new file, as further discussed at 313.

At 313, the remote storage server 302 can optionally return a version of the latest upload to the application server 303. A response message in response to the uploading at 312 is sent from the remote storage server 302 to the application server 303. The response message contains a version value and a checksum of the newly created file.

The application server 303 is configured to periodically, intermittently, or constantly update file information with the storage server 302, so that the application server 303 maintains the latest metadata and content of the data file. At 314, the application server 303 can periodically use an HTTP GET call to get metadata of the file from the remote storage server 302, e.g., every five minutes, etc. The HTTP GET call can take a form similar to "get (GET fileId/fileId)", which is configured to get the file metadata or contents. The remote storage server 302 can optionally return metadata at 315, e.g., via an HTTP PUT message "updateMetadata (PUT fileId/fileId)." At 316, when the data file is closed at the application server 303, the application server can notify the remote storage server 302 by sending an HTTP PUT message "(PUT fileId/fileId/close)" that the storage server can release the lock of the data file at 317, if the data file was potentially locked when the file identifier was created at 306.

Figure 4:
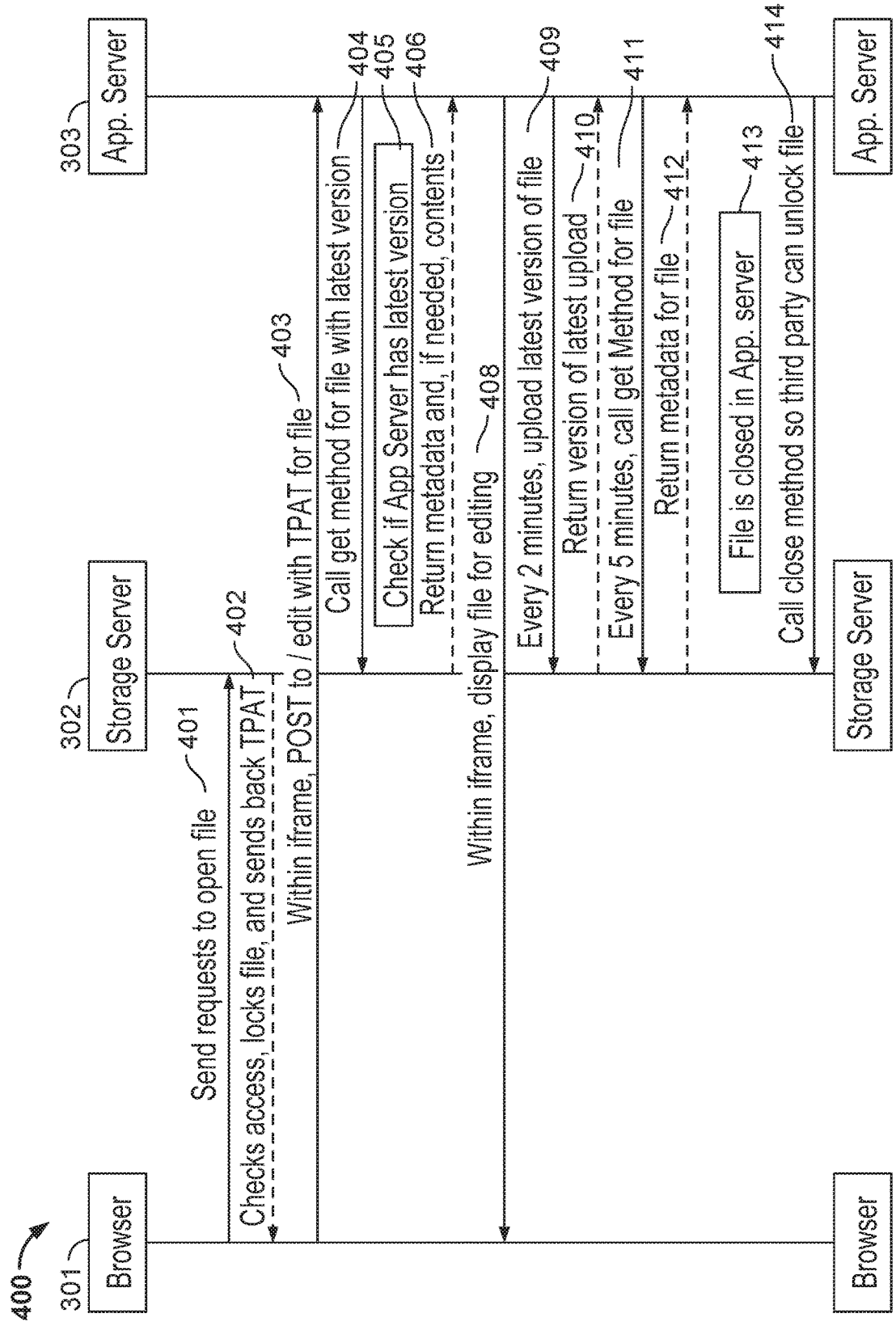
FIG. 4 provides an example flow diagram illustrating aspects of opening a data file in the remote storage server for viewing, commenting or editing from a user device via the API, according to an illustrative embodiment.

FIG. 4 provides an example flow diagram 400 illustrating aspects of opening a data file that is stored by a remote storage server for viewing, commenting, or editing by a user device via an API (e.g., 130 in FIG. 1), according to some embodiments described herein. At 401, a user interface instantiated at a user device (e.g., 101 in FIG. 1), such as a browser 301, sends a file access request to open a file at a remote storage server 302. The user request can include a data file identifier, a storage server identifier, a type of the data file, a user identifier, a user device identifier, and/or the like. At 402, the remote storage server 302 can check access authentication based on a user identifier, e.g., by verifying whether the user identifier is on the access control list associated with the data file that the user has authorization to access the respective data file.

At 402, the storage server 302 then checks the metadata of the data file to verify if another entity has the lock on the data file. For example, the lock status is specified in the file metadata in a "locked for_edit" field. If the file is not already locked by another entity, the storage server locks the file for the application server 303. While the file is locked by another entity, the file can still be opened for viewing (either in the browser 301 or for preview or download). If the application server 303 does not have the lock for the file, the application server will show the user a read-only view with an explanation that the file is being edited by another entity (e.g., another user or another application). Any requests for the file sent from the application server 303 to the storage server 302 can reset the lock for a period of time (e.g., 5 minutes, 15 minutes, etc.). The application server 303 can periodically call the storage server 302, e.g., every 5 minutes, etc., to get updated metadata and keep the lock. In one embodiment, if the request (e.g., the metadata-and-content request to be discussed at 404) for updated metadata fails after three tries, the application server 303 can show, via the browser 301, the user an error message. If the application server 303 fails to make any metadata or content request to the storage server 302 within a period of time (e.g., 15 minutes, etc.), the lock could be lost. If the lock on the file is lost but a file access request to the same file is subsequently received, the storage server 302 can attempt to re-issue the lock to the application server 303. If there issuance of the lock is not possible because another entity has held the lock on the same file, the application server 303 switches to a read-only mode for the file.

At 402, the storage server 302 also sends back the TPAT to the browser 301, in a similar manner as described at 306 in FIG. 3.

At 403, a file access request is generated. The file access request can be an HTTP POST request generated within a structural tag of the HTML source code of a display page of the browser 302, and the HTTP POST request includes the TPAT for the file received from the storage server at 402. The file access request can include a data file identifier, a storage server identifier, a type of the data file, a user identifier, a user device identifier, token (TPAT), and/or the like, as discussed at 201 in FIG. 2.

At 404, the application server 303 can send a metadata-and-content request to the remote storage server 302 to get the metadata and contents for the file or the folder. The metadata-and-content request can be an HTTP GET call. The GET call includes version information of the data file (e.g., a version value) stored in the cache at the application server 303. In one implementation, the application server 303 maintains a data table that maps an internal version value, which has a format compatible with and is used by the application server 303, to an external version value that is compatible with and used by the remote storage server 302 or other entities. The application server 303 can identify or retrieve the internal version value from the metadata stored associated with a cached version of the data file and can then convert the internal version value to the corresponding external version value. The GET call can include the external version value of the data file as a current-version parameter so that the remote storage server 302 can read the current-version parameter and obtain the version value associated with the cached version of the data file cached at the application server 303. The GET call can further optionally include a hash generated from the content of the cached version, as discussed in connection with 204 in FIG. 2. In one implementation, if there is not a data file stored in the cache, an indicator that no cached version exists is included the metadata-and-content request, e.g., similar to 309 in FIG. 3. In one implementation, the metadata-and-content request optionally includes a delivery parameter that specifies whether the storage server 302 should provide the content of the latest version of the data file to the application server if the cached version of the data file at the application server is not the latest version. In one implementation, the application server can optionally request a specific version of the data file in the metadata-and-content request, which may not be the latest version, and can include the version value of the requested specific version in the metadata-and-content request. For example, the metadata-and-content request can optionally include a "requested-version" parameter, which can be configured with a version value to a particular version of the data file is requested. When the metadata-and-content request does not include such requested-version parameter, the latest version of the data file stored on the remote storage server 302 is set as the requested version for the application server by default.

At 405, the remote storage server 302 checks whether the application server 303 has the latest version of the data file, e.g., as discussed at 205 in FIG. 2. In one implementation, as discussed above, application server 303 may not be requesting the content of the latest version and may be requesting a particular version of a data file by configuring a "requested-version" parameter in the metadata-and-content request. At 405, in one implementation, the remote storage server 302 also checks whether there is a "requested-version" parameter in the metadata-and-content request that indicates that the request is for a specific version, and then verifies whether the version value of the cached version stored at the application server 303 is equivalent to the requested specific version value in the "requested-version" parameter. At 406, the remote storage server 302 returns metadata of the file to the application server 303. If the application server does not have the latest version of the contents of the data file, the remote storage server 302 also checks a delivery parameter in the metadata-and-content request to determine whether or not to send the latest version to the application server 303. If the delivery parameter is set for the remote storage server 302 to provide the latest version, the remote storage server 302 sends the contents of the latest version of the data file to the application server 303. In one implementation, if the request is for a specific version, the remote storage server 302 sends the contents of the particular version of the data file to the application server 303. The remote storage server 302 can send an HTTP PUT message to the application server 303 at 406. For example, as discussed at 207, the content of the data file can be sent from the storage server as a copy of data file, or via a URL embedded in a field of the response message sent to the application server 303 at 406. The URL can include a pre-defined link that links to the latest version of the data file stored in the storage server.

At 408, the data file (e.g. document) is displayed, for example, for editing. The document can be displayed within a section defined by a structural tag.

409-414 are similar to 312-317 in FIG. 3. For example, when the data file is already locked by another entity (e.g., another user or another application) at 402, and the application server can only open a "read-only" version of the data file to the user device, the other entity (e.g., the other user or the other application) may potentially make changes to the data file at the storage server. In another example, even if the data file is locked for an application by the storage server at 402, an authorized user can make changes to the data file directly via the storage server. In this case, the application server 303 is configured to periodically, intermittently, or constantly update file information such as the metadata and/or with the storage server 302, so that the application server 303 maintains the latest metadata and content of the data file. At 409, the application server 303 can periodically upload the latest version of the file to the remote storage server 302, e.g., every two minutes, etc. At 410, the remote storage server 302 can optionally return a version of the latest upload to the application server 303. At 411, the application server 303 periodically uses an HTTP GET call to get metadata of the file from the remote storage server 302, e.g., every five minutes, etc. At 412, the remote storage server 302 optionally returns metadata. At 413, when the data file is closed at the application server 303, the application server can notify the remote storage server by sending an HTTP PUT message "(PUT files/fileId/close)" that it can release the lock at 414.

The HTTP actions that can be taken by the API (e.g., 130 in FIG. 1) to create or open a file, as discussed in connection with FIGS. 3-4, can apply to folders as well, e.g., the POST message to create a new folder as a child of a given folder can take a form similar to "create (POST folders/folderId/create)," and a GET message "getMetadata (GET folders/folderId)" can be invoked to get the folder metadata, or the like. When the application server (120 in FIG. 1 or 303 in FIGS. 3-4) operates on a folder in the storage server (110 in FIG. 1 or 302 in FIGS. 3-4), certain metadata properties associated with the folder, such as type (always folder), folder ID, folder name, whether the folder is starred, and folder parent, can be locked so as not to be changed.

In addition to the HTTP messages described above to create or open a file, to update metadata of the file, etc., the API (e.g., 130 in FIG. 1) can invoke a GET list that is adopted by the API as an add-on, to search for files or folders on the storage server. Example parameter for a search query generated via the API can include corpus (default "user"), order-by (default "name"), page size, page token, or the like. In response to the GET list, instead of receiving full content or metadata in an HTTP message, the application server receives properties from the storage server such as a list of file identifiers, sheets of files, a token for the next page of the file, items (e.g., a file or folder with a kind, ID, name, etc.), etc.

Figure 5:
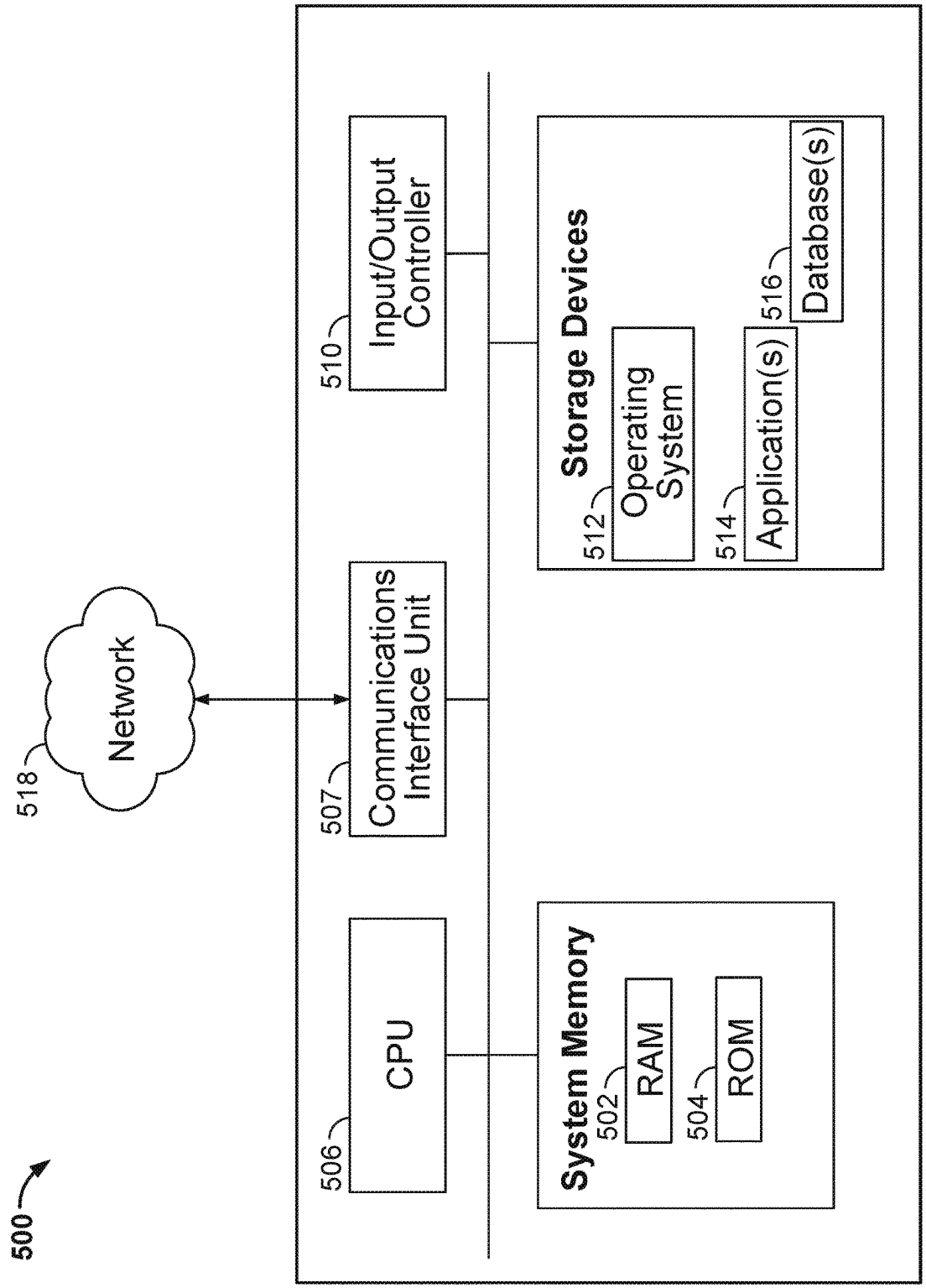
FIG. 5 is a block diagram of a computing device, such as any of the components of the system implemented in FIG. 1, for performing any of the processes described herein, according to an illustrative embodiment.

FIG. 5 is a block diagram of a computing device, such as any of the components of the system implemented in FIG. 1, for performing any of the processes described herein, according to an illustrative embodiment. Each of the components of these systems may be implemented on one or more computing devices 500. In certain aspects, a plurality of the components of these systems may be included within one computing device 500. In certain implementations, a component and a storage device may be implemented across several computing devices 500.

The computing device 500 includes at least one communications interface unit, an input/output controller 510, system memory, and one or more data storage devices. The system memory includes at least one random access memory (RAM 502) and at least one read-only memory (ROM 504). All of these elements are in communication with a central processing unit (CPU 506) to facilitate the operation of the computing device 500. The computing device 500 may be configured in many different ways. For example, the computing device 500 may be a conventional standalone computer or alternatively, the functions of the computing device 500 may be distributed across multiple computer systems and architectures. Alternatively, a computer system may be virtualized to provide the functions of multiple computing devices 500. In FIG. 5, the computing device 500 is linked, via network or local network, to other servers or systems.

The computing device 500 may be configured in a distributed architecture, wherein databases and processors are housed in separate units or locations. Some units perform primary processing functions and contain, at a minimum, a general controller or a processor and a system memory. In distributed architecture implementations, each of these units may be attached via the communications interface unit 508 to a communications hub or port (not shown) that serves as a primary communication link with other servers, client or user computers and other related devices. The communications hub or port may have minimal processing capability itself, serving primarily as a communications router. A variety of communications protocols may be part of the system.

The CPU 506 includes a processor, such as one or more conventional microprocessors and one or more supplementary co-processors such as math co-processors for offloading workload from the CPU 506. The CPU 506 is in communication with the communications interface unit 508 and the input/output controller 510, through which the CPU 506 communicates with other devices such as other servers, user terminals, or devices. The communications interface unit 508 and the input/output controller 510 may include multiple communication channels for simultaneous communication with, for example, other processors, servers or client terminals.

The CPU 506 is also in communication with the data storage device. The data storage device may include an appropriate combination of magnetic, optical or semiconductor memory, and may include, for example, RAM 502, ROM 504, flash drive, an optical disc such as a compact disc or a hard disk or drive. The CPU 506 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 506 may be connected to the data storage device via the communications interface unit 508. The CPU 506 may be configured to perform one or more particular processing functions.

The data storage device may store, for example, (i) an operating system 512 for the computing device 500; (ii) one or more applications 514 (e.g., computer program code or a computer program product) adapted to direct the CPU 506 in accordance with the systems and methods described here, and particularly in accordance with the processes described in detail with regard to the CPU 506; or (iii) database(s) 516 adapted to store information that may be utilized to store information required by the program.

The operating system 512 and applications 514 may be stored, for example, in a compressed, an uncompiled, and an encrypted format, and may include computer program code. The instructions of the program may be read into a main memory of the processor from a computer-readable medium other than the data storage device, such as from the ROM 504 or from the RAM 502. While the execution of sequences of instructions in the program causes the CPU 506 to perform the process steps described herein, hard-wired circuitry may be used in place of, or in combination with, software instructions for implementation of the processes of the present invention. Thus, the systems and methods described are not limited to any specific combination of hardware and software.

Suitable computer program code may be provided for performing one or more functions in relation to performing the processes as described herein. The program also may include program elements such as an operating system 512, a database management system and "device drivers" that allow the processor to interface with computer peripheral devices (e.g., a video display, a keyboard, a computer mouse, etc.) via the input/output controller 510.

The term "computer-readable medium" as used herein refers to any non-transitory medium that provides or participates in providing instructions to the processor of the computing device 500 (or any other processor of a device described herein) for execution. Such a medium may take many forms, including, but not limited to, non-volatile media and volatile media. Nonvolatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer-readable media may be involved in carrying one or more sequences of one or more instructions to the CPU 506 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 500 (e.g., a server) can receive the data on the respective communications line and place the data on a system bus for the processor. The system bus carries the data to the main memory, from which the processor retrieves and executes the instructions. The instructions received by the main memory may optionally be stored in memory either before or after execution by the processor. In addition, instructions may be received via a communication port as electrical, electromagnetic, or optical signals, which are exemplary forms of wireless communications or data streams that carry various types of information.

It will be apparent that aspects of the systems and methods described herein may be implemented in many different forms of software, firmware, and hardware in the implementations illustrated in the drawings. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication networks can include, but are not limited to, for example, any one or more of the following network topologies, including a bus network, a star network, a ring network, a mesh network, a star-bus network, tree or hierarchical network, or the like. The communications modules can be, for example, modems or Ethernet cards.

As discussed above, a computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, an enterprise server or group of servers, one or more desktop computers, one or more laptop computers, etc. Computer system 500 can also be embedded in another device, for example, and without limitation, a mobile telephone, a personal digital assistant (PDA), a mobile audio player, a Global Positioning System (GPS) receiver, a video game console, and/or a television set top box.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single service offering or packaged into multiple service offerings.

What is claimed is:

1. A method comprising:
   receiving, at an application server hosting a plurality of applications and from a user device, a first request to create a data file that is to be stored at a third-party storage server;
   responsive to receiving the first request to create the data file that is to be stored at the third-party storage server, sending, by the application server and to the third-party storage server, a second request indicating that the data file is to be created at the third-party storage server;
   receiving, from the third-party storage server, an indication that the data file has been created at the third-party storage server;
   responsive to receiving the indication that the data file has been created at the third-party storage server, generating, by the application server, an instance of the data file that is stored at the application server; and
   providing, by the application server and to the user device, the instance of the data file for edit via a relevant application of the plurality of applications hosted by the application server.

2. The method of claim 1, further comprising:
   uploading, by the application server and to the third-party storage server, a latest version of the data file stored at the application server.

3. The method of claim 2, wherein the application server periodically uploads the latest version of the data file stored at the application server to the third-party storage server via an application programming interface (API) that operates under Hypertext Transfer Protocol (HTTP).

4. The method of claim 1, wherein the first request to create the data file that is to be stored at the third-party storage server comprises a Hypertext Transfer Protocol (HTTP) message that was generated at the user device within a display area of a browser-based application, the display area defined by a structural tag associated with the browser-based application.

5. The method of claim 1, wherein the first request comprises an access token issued by the third-party storage server for the user device, wherein the access token grants access to the data file for the user device.

6. The method of claim 1, wherein the second request comprises a file identifier, a file name, and an indication that no content for the data file exists at the application server.

7. The method of claim 1, wherein receiving the indication that the data file has been created at the third-party storage server comprises receiving metadata associated with the data file created at the third-party storage server.

8. A system comprising:
   a memory; and
   a processor, coupled to the memory, to:
   receive, at an application server hosting a plurality of applications and from a user device, a first request to create a data file that is to be stored at a third-party storage server;
   responsive to receiving the first request to create the data file that is to be stored at the third-party storage server, send, by the application server and to the third-party storage server, a second request indicating that the data file is to be created at the third-party storage server;
   receive, from the third-party storage server, an indication that the data file has been created at the third-party storage server;
   responsive to receiving the indication that the data file has been created at the third-party storage server, generate, by the application server, an instance of the data file that is stored at the application server; and
   provide, by the application server and to the user device, the instance of the data file for edit via a relevant application of the plurality of applications hosted by the application server.

9. The system of claim 8, the processor further to:
upload, by the application server and to the third-party storage server, a latest version of the data file stored at the application server.

10. The system of claim 9, wherein the application server to periodically upload the latest version of the data file stored at the application server to the third-party storage server via an application programming interface (API) that operates under Hypertext Transfer Protocol (HTTP).

11. The system of claim 8, wherein the first request to create the data file that is to be stored at the third-party storage server comprises a Hypertext Transfer Protocol (HTTP) message that was generated at the user device within a display area of a browser-based application, the display area defined by a structural tag associated with the browser-based application.

12. The system of claim 8, wherein the first request comprises an access token issued by the third-party storage server for the user device, wherein the access token grants access to the data file for the user device.

13. The system of claim 8, wherein the second request comprises a file identifier, a file name, and an indication that no content for the data file exists at the application server.

14. The system of claim 8, wherein to receive the indication that the data file has been created at the third-party storage server comprises receiving metadata associated with the data file created at the third-party storage server.

15. A non-transitory computer-readable medium comprising instructions that, responsive to execution by a processor, cause the processor to perform operations comprising:
receiving, at an application server hosting a plurality of applications and from a user device, a first request to create a data file that is to be stored at a third-party storage server;
responsive to receiving the first request to create the data file that is to be stored at the third-party storage server, sending, by the application server and to the third-party storage server, a second request indicating that the data file is to be created at the third-party storage server;
receiving, from the third-party storage server, an indication that the data file has been created at the third-party storage server;
responsive to receiving the indication that the data file has been created at the third-party storage server, generating, by the application server, an instance of the data file that is stored at the application server; and
providing, by the application server and to the user device, the instance of the data file for edit via a relevant application of the plurality of applications hosted by the application server.

16. The non-transitory computer-readable medium of claim 15, further comprising:
uploading, by the application server and to the third-party storage server, a latest version of the data file stored at the application server.

17. The non-transitory computer-readable medium of claim 16, wherein the application server periodically uploads the latest version of the data file stored at the application server to the third-party storage server via an application programming interface (API) that operates under Hypertext Transfer Protocol (HTTP).

18. The non-transitory computer-readable medium of claim 15, wherein the first request to create the data file that is to be stored at the third-party storage server comprises a Hypertext Transfer Protocol (HTTP) message that was generated at the user device within a display area of a browser-based application, the display area defined by a structural tag associated with the browser-based application.

19. The non-transitory computer-readable medium of claim 15, wherein the first request comprises an access token issued by the third-party storage server for the user device, wherein the access token grants access to the data file for the user device.

20. The non-transitory computer-readable medium of claim 15, wherein receiving the indication that the data file has been created at the third-party storage server comprises receiving metadata associated with the data file created at the third-party storage server.

* * * * *